United States Patent

[11] 3,605,019

[72] Inventors Joseph T. Cutter
Washington, D.C.;
John M. Davies, Potomac; Don G. Freeman, Gaithersburg; Gordon R. Schwarz, Potomac; Richard Vanblerkom, Rockville, Md.

[21] Appl. No. 791,415
[22] Filed Jan. 15, 1969
[45] Patented Sept. 14, 1971
[73] Assignee International Business Machines Corporation
Armonk, N.Y.

[54] SELECTIVE FADING TRANSFORMER
5 Claims, 4 Drawing Figs.

[52] U.S. Cl. 325/65, 325/41, 325/473, 340/146.1, 179/15.55
[51] Int. Cl. H04b 15/00
[50] Field of Search 179/1 AS, 15.55; 324/77; 325/41, 65

[56] References Cited

UNITED STATES PATENTS

| | | | |
|---|---|---|---|
| 3,209,250 | 9/1965 | Burns et al. | 324/77 |
| 3,403,227 | 9/1968 | Malm | 179/1 |
| 3,423,729 | 1/1969 | Heller | 325/41 |

OTHER REFERENCES

Brigham, I.E.E.E. Spectrum, " Fast Fourier Transform," 12-1967, pp. 63-70.

Miranker, IBM Technical Disclosure, " Recovery of Diffusion-Deteriorated Signals," Vol. 5, No. 1, 6-1962.

*Primary Examiner*—Robert L. Griffin
*Assistant Examiner*—P. M. Pecori
*Attorneys*—Hanifin and Jancin and James David Jacobs

ABSTRACT: The invention is a communication system which causes errors introduced by selective frequency fading channels to be time localized. It does this by transmitting the Fourier transform of the baseband signal. The preferred embodiment consists of a frequency division multiplexor multiplexing a plurality of channels and a Fourier transformer taking the Fourier transform of the digital representation of the resultant waveform. The Fourier transform is reconverted into an analog representation by a D-A converter and transmitted by means of an A-D converter. The receiver reconverts the analog representation of the Fourier transform into a digital signal, a Fourier transformer takes the inverse transform, as a D-A converter, reconverts the digital representation back into an analog waveform and then an FDM demodulator demultiplexes the analog waveform resulting in a signal representative of the input to the transmitter with errors introduced by the channels appearing as burst errors (time localized).

INVENTORS
J.T. CUTTER
J.M. DAVIES
DON G. FREEMAN
G.R. SCHWARZ
R.V. VAN BLERKOM

BY James David Jacobs
AGENT

SELECTIVE FADING TRANSFORMER

GOVERNMENT CONTRACT

The invention herein described was made in the course of or under a contract with the Dept. of the Air Force (F30-602-67-C-0081).

CROSS-REFERENCE TO RELATED APPLICATIONS

Ser. No. 768,474, filed Oct. 17, 1968, entitled, "Real Time Digital Fourier Analyzer,"by J. T. Cutter, et al.

BACKGROUND OF THE INVENTION

1. Field of the Invention

The invention relates to radio communications and telephony and especially systems designed to reduce noise and frequency fading characteristics of communication channels.

2. Description of the Prior Art

Many techniques have been developed to increase the reliability of information transmission over fading media. One system uses two wide band orthogonal signals for transmission of binary information. The receiver correlates the received waveform with successively delayed reference waveforms. The delays are sufficiently long that the correlation peaks resulting from separate multipath signal components can be resolved. These correlation peaks are delayed, optimally rated to maximize signal-to-noise ratio, and combined in a linear combiner. The use of a wide band signal is mandatory in this system since it depends for success upon the narrowness of the autocorrelation function of the signal. Thus, the system has a disadvantage that it does require a wide band channel for transmission.

In another system a binary baseband is used to phase-key a carrier; the carrier is simultaneously phase-keyed in quadrature by the same data stream after it has been time delayed. Thus each bit in a baseband appears twice in a modulated carrier. The modulated carrier can then be divided into 34 element frames and Fourier-transformed in such a way that modulations from each of the 34 serial elements is mapped to a particular subcarrier in a frequency-multiplex signal. Since each data bit appears on two elements of the serial stream, each bit appears on two FDM subcarriers. Thus, this system achieves frequency diversity by Fourier transformation of a time-diverse signal, and it is this frequency diversity which is used to overcome the effect of selective fading within the transmission bandwidth. However, this system necessitates extremely expensive synchronization and unusually high cost transmission and modulation equipment. Moreover, this system does not lend itself to easily implemented error correction schemes for correction of errors induced by the channel.

If frequency fades were predictable and did not vary over time, they would present little problem. The transmitted signal could be sent with no information in the bands where a frequency fade would occur. However, since frequency fades occur randomly throughout the channel, and they vary slowly from frequency to frequency, such compensation cannot be made.

Another system which attempts to correct for such frequency fades is used. It sends a pilot tone which varies over the complete bandwidth of the information signal. At the receiver the areas where frequency fades occur are located, the information is transmitted back to the transmitter, so that it in turn (the transmitter) can transmit the information over frequencies other than where the fades occur.

A third system multiplexes a number of data streams to be transmitted over a set of narrow band transmitted channels. The data streams are divided into equal time periods, which in turn are subdivided into a number of subdivisions equal to the number of narrow bands in the transmission channel. The first subdivision of each of the data streams is transmitted serially over the first narrow and in the transmission channel, the second subdivision of each of the data streams is transmitted over the second narrow band in the transmission channel, etc. Frequency fading will cause time isolated errors in the reconstructed signal at the receiver resulting in easy implementation of error correcting schemes. The equipment necessary to multiplex the various data streams onto the transmission channels and reconstruct the original data streams, however, is prohibitively expensive.

Thus, it is an object of this invention to produce a communications system for transmission over frequency fading channels.

Another object of the invention is to provide for the above objects over a limited bandwidth with respect to prior art systems.

Another object of the invention is to provide for the above objects with correction of errors induced by the channel.

It is a further object of this invention to provide such communications system that is easily implemented and inexpensively constructed.

SUMMARY OF THE INVENTION

The invention is designed to operate over selectively fading channels. It transforms the frequency-selective fading characteristics of the channel into a repetitive amplitude-modulation of the detected signal envelope. If the baseband is an FDM (frequency division multiplexor) vector signal, a long fade at a particular frequency, which would otherwise obliterate a single channel or an adjacent group of channels, is transformed to a repetitive time drop out in all channels. Moreover, the system can incorporate a burst-error correcting code which can be used to "bridge" this time drop out, resulting in an improved performance over the fading channel without the use of diversity transmission.

The preferred embodiment considers an FDM baseband signal consisting of a number of frequency-stacked FM subcarriers. Each subcarrier is modulated by binary data system which has been processed to include burst-error coding. Rather than transmitting the baseband signal itself, the system transmits a signal which is related to the Fourier transform of the baseband signal. In this manner, the frequency-dependent channel perturbations are transformed into time-dependent effects in their receiver, where the inverse transform of the received signal is determined. Because the transmitted carrier is linearly modulated, the received signal is just the transmitted signal periodically amplitude-modulated by the magnitude of the channel's frequency response. The repetition period of the modulation is determined by the time interval over which the finite Fourier transform of the signal is taken.

Since the received signal is just the transmitted signal periodically amplitude-modulated by the magnitude of the channel frequency response, if the channel has a small frequency drop out, the recovered signal after the inverse Fourier transform is taken, will have a small time drop out over each time interval. If the baseband data stream incorporates a suitable burst-error correcting code, then the time drop outs, which appear in the digital data streams as burst errors, can be successfully restored.

The preferred embodiment of the invention includes a multiplexor for frequency division multiplexing (FDM) a number of data streams into one data steam. The input to the system consists of four binary data streams. Each stream is separately processed by a Burst-Error Correcting Coder. A modulator then modulates each stream on different carriers separated in frequency by a sufficient amount that the resultant spectrum do not overlap. In the preferred embodiment the particular modulation scheme is a four-level phase modulation. The resultant modulated carriers are summed in an error to form a single FDM signal. This resultant data stream is acted upon by an analog-to-digital converter which converts the analog form into a digital data stream. A Real Time Digital Fourier Analyzer (RTDFA) such as taught by the cross-referenced Cutter, et al. application divides the resultant digital data stream into equal time intervals and calculates the Fourier transform for each time interval. A digital-to-analog converter reconverts the digitally expressed Fourier transform output from the RTDFA into an analog waveform which is transmitted over the selectively fading frequency channel.

At the receiver the frequencies from the original transmitted analog waveform which have survived the channel are sampled and converted into a digital stream by a sampler and analog-to-digital converter. A RTDFA takes the inverse Fourier transform of the output of the analog-to-digital converter. The inverse transform is converted from its digital form to an analog form by a digital-to-analog converter. Finally, the output is passed through band-pass filters and demodulators to suitably demultiplex and detect the waveform.

BRIEF DESCRIPTION OF THE DRAWINGS

The foregoing and other objects, features and advantages of the invention will be apparent from the following more particular description of the preferred embodiments of the invention, as illustrated in the accompanying drawings.

DESCRIPTION OF THE PREFERRED EMBODIMENTS

Before describing the preferred embodiments the theoretical basis which explains its operation is given. Let the baseband signal be $f(t)$; in a general embodiment the signal may be either a single signal or a multiplexed composite signal. Baseband signals $f$ are divided into a number of equal time periods T where T equal 1/B where B is equal to the bandwidth of the baseband signal. The Fourier transform of $f$ is obtained.

$$\Psi[f(t)=F(w) \qquad \text{Eq. 1}$$

and is transmitted as a time function by a linear modulation technique. Thus, the transmitted signal is $$S_T(t)=F(t) \qquad \text{Eq. 2}$$

The transfer function of a linear, slow selective fading channel will be represented by $H(w)$. The impulse response of the channel is $h(t)$, where $$H(w)=\Psi[h(t)] \qquad \text{Eq. 3}$$

After transmission over the fading channel, the received signal $S_R(t)$ is $$S_R(t)=S_T(t)*h(t)=F(t)*h(t) \qquad \text{Eq. 4}$$

where the * connotes the convolution operator. REmember that the result of sending a signal through a channel is equal to that signal convoluted with the impulse response of the channel.

Figure 1:
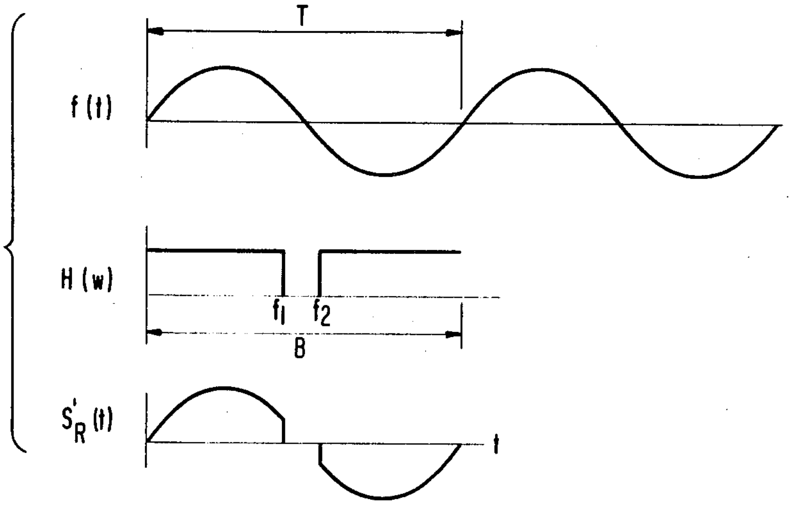
FIG. 1 is a graphical representation of the effect the invention has on analog waveforms in a selective frequency fading channel.

Referring now to FIG. 1 the baseband signal $f(t)$ is illustrated before transmission. Also illustrated is the transfer function of the channel $H(w)$. It should be noticed over the bandwidth B there is a small region from frequency $f_1$ to $f_2$ where the transfer function value is zero. This could be caused by a number of well known effects exemplified by ionispheric fading. Also, for purposes of illustration only one fade is illustrated in the channel bandwidth considered. However, it should be recognized that many fades could exist, and that they need not be of the perfect rectangular shape illustrated.

At the receiver $S_R(t)$ is passed through a RTDFA which takes its Fourier transform resulting from $$\Psi[[S_R(T)]=\Psi[F(t)*h(t)]=f(w)H(w)=S'_R(W) \qquad \text{Eq.5}$$

This is interpreted in the time domain as the desired received channel multipled by the frequency characteristic of the transmission channel. Thus, $$S'_R(w)=S'_R(T)=f(t)H(t)$$

Referring now to FIG. 1 again, the received signal $S'_R(t)$ is shown. As can be seen from the diagram and Eq. 6, the frequency fades appear in each $T$ interval as a time localized error. Thus, by transmitting the Fourier transform of the original time domain signal, what would have appeared as frequency fades spread throughout the channel wherever they occurred, now appear as time localized errors in the received signal.

DESCRIPTION OF FIGURE 2

Figure 2:
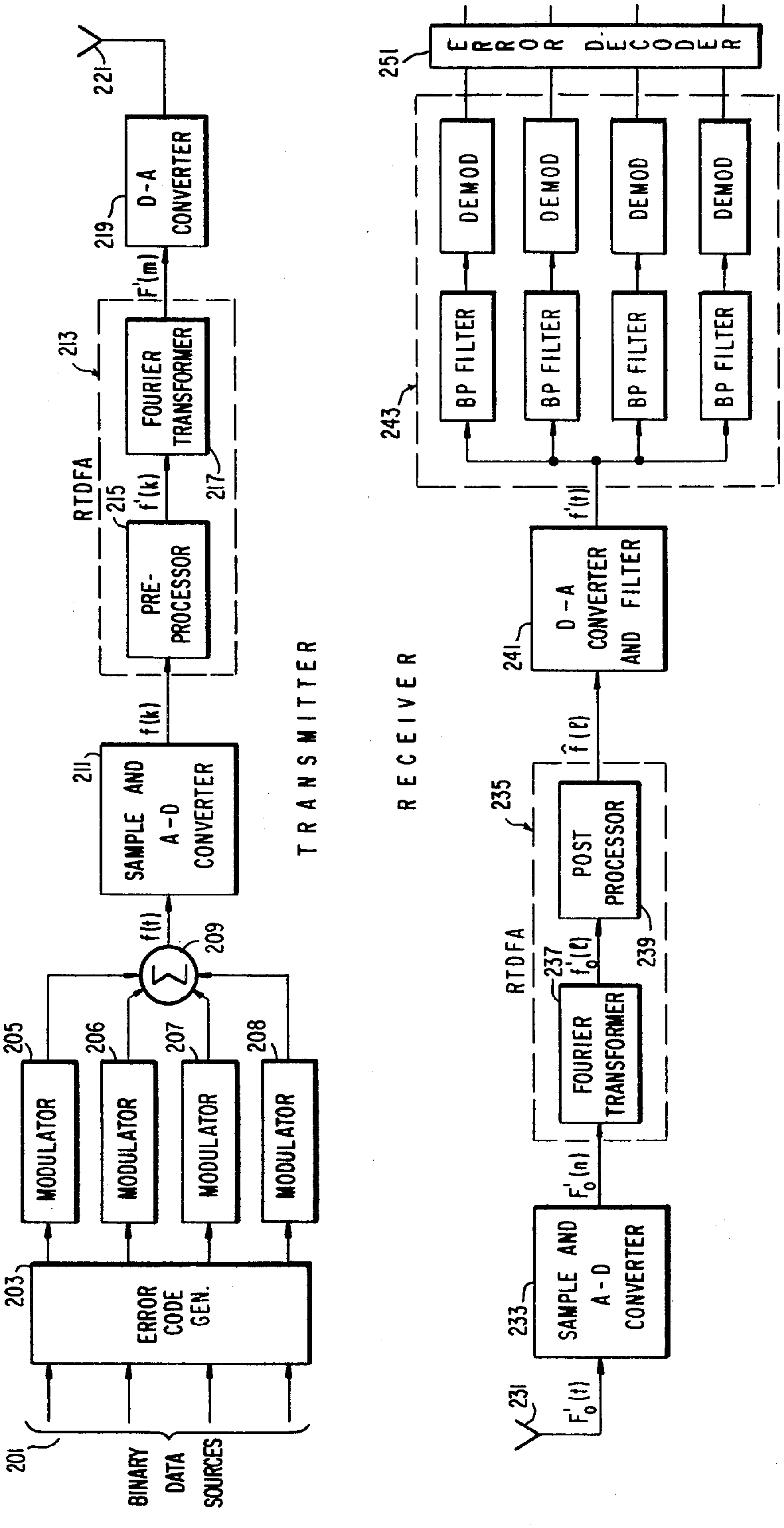
FIG. 2 is the preferred embodiment of the invention.

Shown in FIG. 2 is the preferred embodiment of the invention. Since a person skilled in the art would easily supply the necessary synchronization, timing signals and clocks are not shown, for reasons of clarity. At the input 201 is a plurality of binary data sources. They feed into error code generator 203. Error code generation 203 encodes each of the channels with an error correction coding. Devices suitable for such a task are disclosed by A. H. Frey, Jr. in U.S. Pat. Applications, Ser. No. 602,101, now Pat. No. 3,487,361 and Ser. No 629,667, filed Apr. 10, 1967. In the preferred embodiment each of these codes signals are FDM. Each of the output of error code generator 203 form an input to their respective modulators 205–208. The carriers modulated in modulators 205–208 are separated in a frequency by a sufficient amount that the resultant spectrum do not overlap. The particular modulation scheme to be used must be chosen to maximize the bandwidth utilization. It must also, be relatively immune to amplitude variations. In he preferred embodiment multilevel phase modulation is preferred. For example, the use of four-level phase modulation permits the simultaneous transmission of baseband data and error-coding redundancy in quadrature.

The output of modulators 205–208 are summed by summer 209 which forms the FDM signal. The output of summer 209 forms the input of Sample and A–D (analog-to-digital) converter 211. Sample and A–D Converter 211 produces a digital data stream which forms the input to the RTDFA (Real Time Digital Fourier Analyzer) 213.

In the preferred embodiment the RTDFA 213 is a special purpose computer composed of a preprocessor 215 and a Fourier transformer 217 such RTDFA is taught by the cross-referenced application of Cutter, et al., Ser. No. 768,474. But it also could be a general purpose computer programmed with the Cooley-Tukey algorithm or any other suitable device.

In general, if the finite Fourier transform of a segment $0\leq t<T$ of a baseband signal $f(t)$ is computed, the resulting function will be complex. In order to generate a real signal for transmission over the channel, some processing must be performed on $f(t)$ to convert it into a signal which has a real Fourier transform. It is well known that a complex function whose real part is even and whose imaginary part is odd has a real Fourier transform. $f(t)$ can be operated upon to produce such a function. Preprocessor 215, operates on the baseband signal $f(t)$ to accomplish such a result. Preprocessor 215, is better described in conjunction with FIGS. 3 and 4.

The output of preprocessor 215 forms the input to Fourier transformer 217. The real time digital Fourier analyzer disclosed in the patent application of Cutter et al., Ser. No. 768,474, filed Oct. 17, 1968, is suitable to perform the function of RTDFA 213.

The output of RTDFA 213 forms the input to D–A (digital-to-analog converter 219. D–A converter converts the Fourier transform of signal $f(t)$ from a digital representation to an analog representation. The output of D–A converter 219 forms the input to antenna 221. If necessary, antenna 211 represents all hardware necessary to transmit the signal over the desired communication system. That is, if necessary to augment the output of D–A converter 219 with a radio frequency signal, it would be well within the skill of the art to do so.

Also, one skilled in the art would recognize that in place of RTDFA 213 one could substitute a general purpose digital computer programmed to accomplish the same functions that are accomplished by special purpose computers preprocessor 215 and Fourier transformer 217. In addition, one skilled in the art would recognize that if for RTDFA 213 one was to substitute an analog computer, Sample and A–D converter 211 and D–A converter 219 could be omitted.

At the receiver the received waveform acted upon by the transfer function of the communication channel is received by antenna 231. The received signal forms the input to sample an A–D converter 233 where it is sampled and converted into a digital representation. The output of sample and A–D converter 233 forms the input to RTDFA 235. RTDFA 235 construction is similar to that of RTDFA 213 in that it comprises a Fourier transformer 237 similar in construction to Fourier transformer 217 and a post processor 239 similar in construction to preprocessor 215. As one skilled in the art can see post processor 239 is just the inverse of preprocessor 215 and will not be described in more detail. For a further description see the description below in conjunction with FIGS. 3 and 4.

The output of RTDFA 235 forms the input to D–A converter and filter 242. The filter function of D–A converter and filter 241 acts as well known in the art to reduce any superfluous and unnecessary freqúencies.

The output of D–A converter and filter 231 forms the input to FDM demodulator 243 which consists of a plurality of band-pass filters and their respective demodulators. The output of FDM demodulator 243 are connected to the inputs of error decoder 251. Error decoder 251 decodes error codes and corrects any errors in the data. Error decoder 251 presents at its outputs binary data signals.

In light of the above description and theory, the operation of FIG. 2 is obvious.

DESCRIPTION OF FIGURE 3

Figure 3:
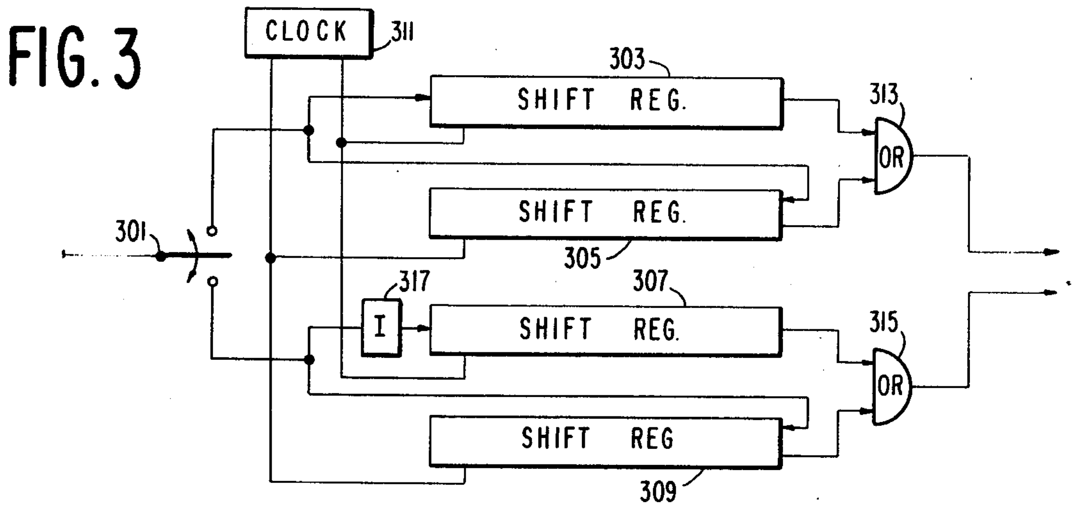
FIG. 3 is the preferred embodiment of preprocessor 215 of FIG. 2.

Shown in FIG. 3 is the preferred embodiment of preprocessor 215 (and by implication post processor 239, see above). Preprocessor 215 operates in the following way. Assume that $f(t)$ is sampled at the Nyquist rate of ½ $B$, where $B$ is the bandwidth of $f(t)$. Consider that $N$ samples are obtained in time $t$ by sample A–D converter 211. Thus, $N=2BT$. These samples are divided into two groups each containing $N/2$ samples. These two groups are referred to as $f_1(j)$ and $f_2(j), 0\leq j<N/2$. We now construct two new functions, $f_e(k)$ and $f_0(k)$, as follows:

$$f_e(k)= \quad 0\leq k\leq N/2$$
$$=f_1(N\ k) \quad N/2\leq k<N$$
$$f_0(k)=-f_2(k) \quad 0\leq k<N/2$$
$$=f_2(N\text{-}k) \quad N/2\leq k<N \quad \text{Eq. 7}$$

About the point $k=N1\ 2, f_e(k)$ is an even function, and $f_0(k)$ is an odd function. Therefore, $$f'(k)=f_e(k)+jf_0(K) \qquad \text{Eq. 8}$$

has $N$ complex values and a real transform.

The input to preprocessor 215 from sample and A–D converter 211 is fed to switch 301. Switch 301 alternates between the input to registers 303 and 305 and the input to inverter 317 and register 309. That is, the first, third, fifth, etc. digital bits are stored in registers 303 and 305, and the second, fourth, sixth, etc. are stored in registers 307 and 309. Notice, that the contents of register 303 is fed into the front of the register, the contents of register 307 is fed into the front of the register in inverted form from inverter 317 and the contents of register 305 and 309 are fed into the back of the registers. Therefore, upon reading out registers 303 or 307, the output will be in the same order as the data forming the input to switch 301. However, the output of registers 305 and 309 will present the data input to switch 301 in reverse order.

Registers 303 and 307 re caused to read out upon a timing pulse 1 and registers 305 and 309 are caused to read out by a timing pulse 2. These timing pulses are generated by clock 311. Clock 311 is synchronized with the binary data sources and the other hardware shown in FIG. 2 by conventional means. In order to simplify the drawings such connections are not shown.

The outputs of registers 303 and 305 form the input to OR circuit 313; and the output of registers 307 and 309 form the inputs to OR circuits 315. The outputs of OR circuits 313 and 315 from input to Fourier transformer 217 and by implication to D–A converter and filter 241).

OPERATION OF FIGURE 3

Figure 4:
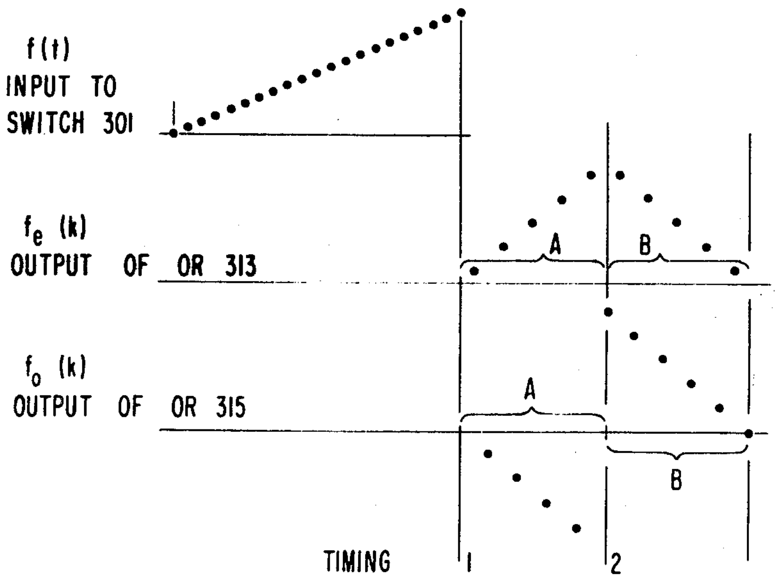
FIG. 4 is a graphical representation of the operation of the preprocessor 215 illustrated in FIG. 3.

Shown in FIG. 4 are the inputs and outputs of the circuitry shown in FIG. 3. That is, $f(t)$ represents the digital data input to switch 301, $f_3(k)$ represents the output of OR 313, and $f_o(k)$ represents the output of OR 315. Shift register 303 provides a temporary storage for $f(t)$. The output of shift register 303 provides a first input to summation circuit 313. Shift register 305 is loaded with $f(t)$ in a reverse manner thereby providing a temporary storage for $f(-t)$. The output of shift register 305 provides a second input to summation circuit 313. The output of summation circuit 313 therefore is $f(t)+f(-t)$ which is $f_e(k)$.

Similarly, shift register 307 storage $f(t)$ while shift register 309 stores $f(-t)$. $f(t)$ being connected to a first input of difference circuit 315 and $f(-t)$ being connected to a second input of difference circuit 315, the output of difference circuit 315 is therefore $f(t)-f(-t)$ or $f_o(k)$. This operation is based upon the following formulas $$f(t)=1/2(fae(k)+f_o(k))$$
$$\text{i } f(-t)=1/2(fae(k)-f_o(k))$$

Therefore, to achieve $f_e(k)$ we take $f(t)+f(-t)$

To achieve $f_o(k)$ we take $f(t)-f(-t)$.

Referring now to the input to switch 301, $f(t)$ is seen to be made up of a series of discrete values increasing in magnitude. The first of the discrete values is placed into shift registers 303 and 305; the second into shift registers 307 (in inverted form), 309, the third into shift registers 303 and 305, etc. After the shift registers have completely been loaded a timing pulse 1 occurs. This causes both the shift registers 303 and 307 to dump their contents thus forming parts A of both $f_e(k)$ and $f_0(k)$. At timing pulse 2 shift registers 305 and 309 dump their contents thus forming part B of $f_e(k)$ and $f_o(k)$. Thus, the outputs of 313 and 315 are $f_e(k)$ and $f_o(k)$. That these two curves agree with Eq. 7 above can be seen from inspection.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A communications system time localizing errors of signals sent through a selective frequency fading channel including:

a transmitter including:

frequency division multiplexing means converting a plurality of binary data sources into a single analog waveform;

first analog-to-digital converter means taking the output of said frequency division multiplexing means and producing a digital representation of its input;

a first real time digital Fourier analyzer means taking the output of said analog-to-digital converter means and producing its Fourier transform representation; and a first digital-to-analog converter means converting the output of said real time digital Fourier analyzer into an analog waveform; and transmitting means transmitting the output of said digital-to-analog converter over a selected frequency fading channel;

a receiver including:

receiving means receiving said analog waveform transmitted by said transmitting means;

second analog-to-digital converter means converting the output of said receiving means into its digital representation;

second real time digital Fourier analyzer means taking the inverse transform of the output of said second analog-to-digital converter means;

second digital-to-analog converter means converting the output of said real time digital Fourier analyzer into its analog representation; and frequency division demultiplexing means converting the output of said second digital-to-analog converter means into a plurality of waveforms representative of the input to said transmitter.

2. A device as in claim 1 including:

error correcting means associated with said frequency division multiplexing means encoding the input to said frequency division multiplexing means so as to correct for burst errors.

3. A device as in claim 2 wherein said first real time digital Fourier analyzer includes:

preprocessor means transforming the input to said real time digital Fourier analyzer into a complex function, the real part of which is even and the imaginary part of which is odd; and a Fourier transformer taking the Fourier transform of said complex function by means of the Cooley-Tukey algorithm.

4. A communications system for time localizing errors caused by selected fading frequency communications channels, comprising:

a transmitter comprising:

freequency division multiplexing means for converting a plurality of data sources into a single waveform;

a first real time digital Fourier transformer responsive to the output of said frequency division multiplexing means for producing a Fourier transform representation of said outputs;

transmitting means for transmitting the output of said Fourier transformer including time localized errors over a communications channel subject to selective frequency fading;

a receiver, comprising:

receiving means for receiving said waveform transmitted by said transmitting means;

a second real time Fourier transformer for taking the inverse transform of the output of said receiving means;

and frequency division demultiplexing means for converting the output of said second Fourier transformer into a plurality of waveforms representative of the input to said transmitter.

5. A device as in claim 4, further comprising:

error code generating means associated with said frequency division multiplexing means for encoding the input to said frequency division multiplexing means; and error code decoding means connected to the outputs of said frequency division demultiplexing means for correcting burst errors.